United States Patent
Liu et al.

(10) Patent No.: US 9,905,251 B2
(45) Date of Patent: Feb. 27, 2018

(54) WRITE CURRENT SWITCHING IN A DATA STORAGE DEVICE

(71) Applicant: Seagate Technology LLC, Cupertino, CA (US)

(72) Inventors: Xiong Liu, Singapore (SG); Michael R. Montemorra, Longmont, CO (US); Ralph W. Cross, Lyons, CO (US); Todd M. Lammers, Lafayette, CO (US); Quan Li, Singapore (SG); Beng Theam Ko, Singapore (SG); Kirill Rivkin, Edina, MN (US); Mourad Benakli, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 20 days.

(21) Appl. No.: 15/043,801

(22) Filed: Feb. 15, 2016

(65) Prior Publication Data

US 2017/0236534 A1    Aug. 17, 2017

(51) Int. Cl.
G11B 5/09      (2006.01)
G11B 5/012     (2006.01)
G11B 20/12     (2006.01)

(52) U.S. Cl.
CPC .............. *G11B 5/09* (2013.01); *G11B 5/012* (2013.01); *G11B 20/1217* (2013.01)

(58) Field of Classification Search
CPC ....... G11B 5/09; G11B 5/012; G11B 20/1217; G11B 20/10009
See application file for complete search history.

(56) References Cited

U.S. PATENT DOCUMENTS

| | | | | |
|---|---|---|---|---|
| 5,721,856 | A * | 2/1998 | Takeuchi | G11B 19/00 369/30.03 |
| 6,466,386 | B1 * | 10/2002 | Dakroub | G11B 5/09 360/46 |
| 6,798,591 | B2 | 9/2004 | Barnett et al. | |
| 6,879,455 | B2 | 4/2005 | Ngo et al. | |
| 7,035,028 | B2 | 4/2006 | Venca et al. | |
| 7,206,155 | B2 | 4/2007 | Kuehlwein et al. | |
| 7,242,544 | B2 | 7/2007 | Price, Jr. et al. | |
| 7,290,184 | B2 * | 10/2007 | Bruner | G11B 20/1866 714/704 |
| 7,417,817 | B1 | 8/2008 | Aram et al. | |
| 8,804,261 | B2 | 8/2014 | Mazur et al. | |
| 2012/0019947 | A1 | 1/2012 | Kuehlwein et al. | |

* cited by examiner

*Primary Examiner* — Kyle Vallecillo
(74) *Attorney, Agent, or Firm* — Hall Estill Attorneys at Law

(57) ABSTRACT

Method and apparatus for enhancing write current switching efficiencies during data write operations in a data storage device. In some embodiments, write data are described in the form a sequence of symbols of nT length where T is a channel clock rate and n is an integer over a selected range. Bi-directional write currents are applied to a write element to record the sequence of symbols to a storage medium. The write currents are switched between a first rail current and a second rail current for alternating symbols. The write currents are further transitioned to an intermediate current value for at least one channel clock period immediately preceding a next occurrence of a symbol boundary between an adjacent pair of symbols in the sequence.

20 Claims, 5 Drawing Sheets

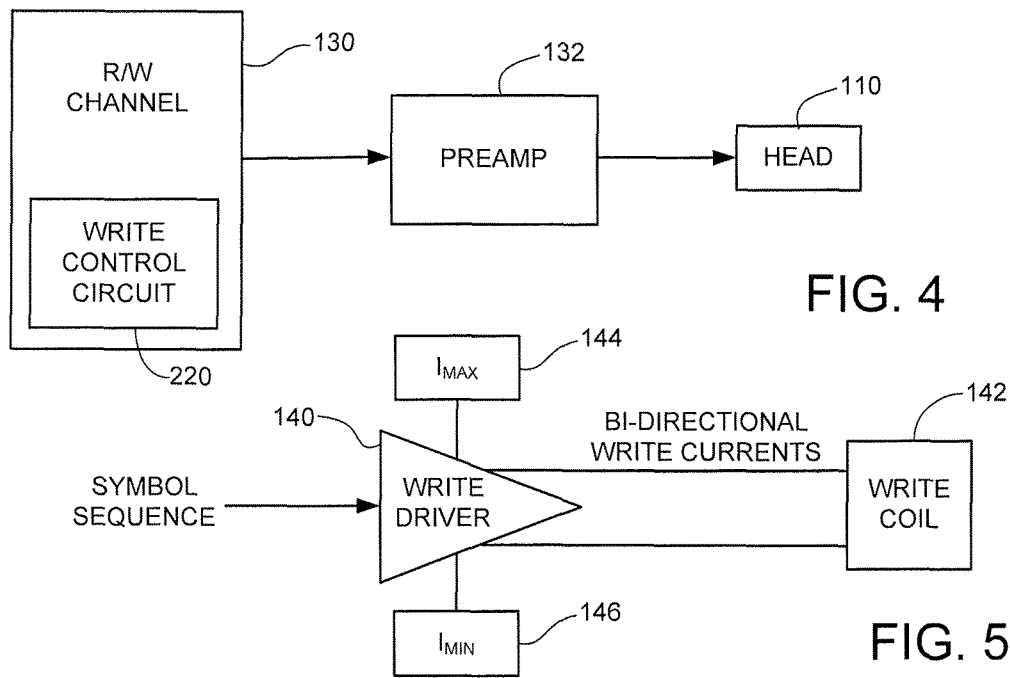
FIG. 4
FIG. 5
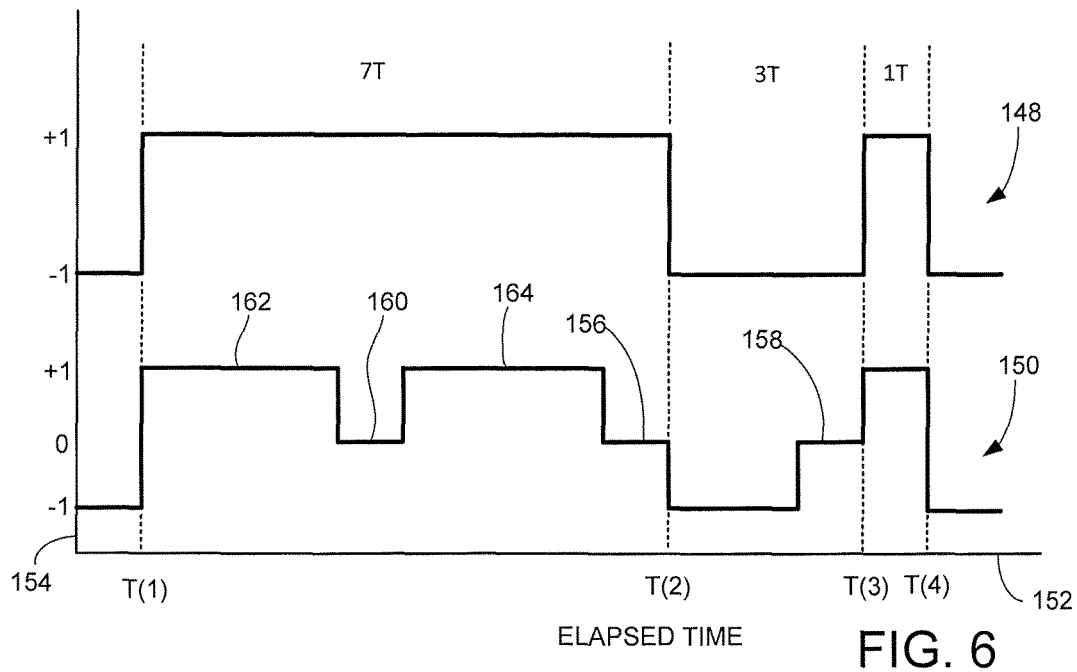
FIG. 6

WRITE CURRENT SWITCHING IN A DATA STORAGE DEVICE

SUMMARY

Various embodiments of the present disclosure are generally directed to a method and apparatus for write current switching in a data storage device.

In some embodiments, write data are described in the form of a sequence of symbols of nT length where T is a channel clock rate and n is an integer over a selected range. Bi-directional write currents are applied to a write element to record the sequence of symbols to a storage medium. The write currents are switched between a first rail current and a second rail current for alternating symbols. The write currents are further transitioned to an intermediate current value for at least one channel clock period immediately preceding a next occurrence of a symbol boundary between an adjacent pair of symbols in the sequence.

In further embodiments, an apparatus has a data recording medium and a write element controllably positionable adjacent the data recording medium to write data thereto. A channel circuit is configured to generate a sequence of symbols of nT length where T is a channel clock rate and n is an integer over a selected range. A write driver circuit is configured to apply bi-directional write currents to the write element to record the sequence of symbols to the data recording medium responsive to an input supplied to the write driver circuit by the channel circuit. The write driver circuit switches the write currents between a positive rail current and a negative rail current for alternating symbols. The write driver circuit further transitions the write currents to an intermediate current value between the respective positive and negative rail currents for at least one channel clock period immediately preceding a next occurrence of a symbol boundary between an adjacent pair of symbols in the sequence.

In still further embodiments, a data storage device has a rotatable magnetic data recording medium and a write element that is controllably positionable adjacent the data recording medium to write data to a recording layer thereof as a magnetic pattern. A channel circuit is configured to generate a sequence of symbols of nT length where T is a channel clock rate and n is an integer over a selected range. The channel circuit outputs an extended frequency modulation (EFM) signal that encodes the sequence of symbols using a first voltage level corresponding to a first magnetization direction, a second voltage level corresponding to an opposing second magnetization direction, and a third voltage level between the first and second voltage levels. A write driver circuit is configured to apply bi-directional write currents to the write element to record the sequence of symbols to the data recording medium responsive to receipt of the EFM signal. The write currents include a positive rail current corresponding to the first voltage level in the EFM signal, a negative rail current corresponding to the second voltage level in the EFM signal, and an intermediate current value corresponding to the third voltage level in the EFM signal. The channel circuit switches the EFM signal between the first and second voltage levels at boundaries between successive symbols in the sequence of symbols. The intermediate current value is applied for at least one channel clock period immediately preceding a next occurrence of a symbol boundary between an adjacent pair of symbols in the sequence.

BRIEF DESCRIPTION OF DRAWINGS

FIG. 4 is a functional block diagram of the data transducer (head) from FIG. 2 in conjunction with a read/write (R/W) channel and a preamplifier/driver (preamp) circuit of the exemplary data storage device.

FIG. 5 shows a write driver circuit of the preamp in conjunction with a write coil of the transducer.

FIG. 6 is a timing diagram illustrating data sequences provided to the write driver in accordance with various embodiments.

DETAILED DESCRIPTION

Figure 1:
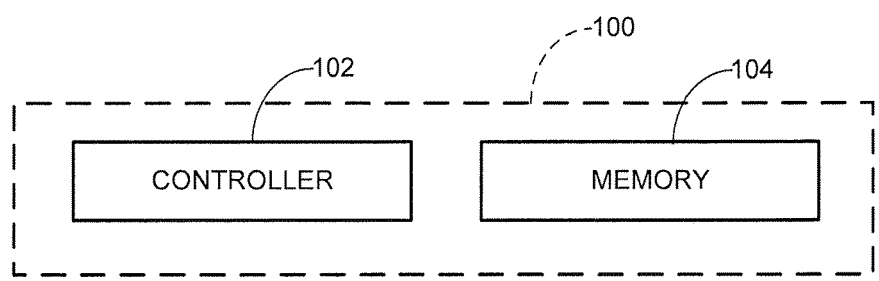
FIG. 1 is a simplified functional block diagram of a data storage device constructed and operated in accordance with various embodiments of the present disclosure.

The present disclosure is generally directed to data storage systems, and more particularly to a method and apparatus for enhancing write current switching efficiencies during data write operations.

Data storage devices store and retrieve data from a host device in a fast and efficient manner. Some data storage devices employ rotatable recording media (discs) which are rotated at a high rotational velocity. One or more data transducers (heads) are movably positioned adjacent tracks defined on the disc surfaces to write and read data to and from the media.

The data are often written in the form of symbols of nT length, where T is a channel clock rate and n is an integer over a selected range. The range for the value n can vary depending on the requirements of a given storage device environment. Exemplary ranges can include symbol lengths of from 1T to 8T, 3T to 16T, etc.

In magnetic recording discs, bi-directional write currents are supplied to a write coil to write the symbol sequence to the medium, with magnetic flux transitions (reversals) being supplied at each symbol boundary. The magnetic flux transitions are interpreted as a first logical value (e.g., logical 1), and a second logical value (e.g., logical 0) is assigned to each of the channel bits between adjacent symbol boundaries.

Run length limited (RLL) encoding (e.g. 8/9, 16/17, etc.) is applied to establish the available symbol set by incorporating rules with regard to how closely spaced and how far apart the symbol boundaries (e.g., logical 1s) can be located in the recorded sequence. For example, a symbol set with a minimum symbol length of 1T allows transitions (logical 1s) to be immediately adjacent one another with no intervening logical 0s therebetween (e.g., the sequence "11" can be written to the medium). By contrast, a symbol set with a minimum symbol length of 2T requires at least two (2) logical 0s be present between successive logical 1s (e.g., 1001 is the closest two logical 1s can appear on the medium). A symbol set with a maximum symbol size of 8T allows no more than eight (8) logical 0s between successive logical 1s (e.g., 100000001 is the maximum distance between logical 1s), and so on.

Increasing the data storage density along a track (such as in terms of bits per inch, or BPI) can generally be achieved by increasing the effective channel clock rate T. The channel clock rate T can be increased by using a higher write frequency clock and/or rotating the medium at a higher rotational velocity. Generally, a higher channel clock rate T provides a shorter amount of elapsed time between successive transitions on the medium as the medium rotates adjacent the associated transducer.

There will generally be an upper limit to how short the smallest symbols in the symbol set can be from an elapsed time and distance standpoint. For example, the use of extremely short symbols in the symbol set, such as 1T symbols, can provide degradation in the reliability of the write operation if there is insufficient time for the write driver to obtain a full reversal of the write current through the coil during the period of time that the 1T (or other short length) symbol is being written. Stated another way, the shortest symbols in the set may not be "long" enough from a time or distance standpoint to enable the system to adequately magnetize the medium and store the desired magnetization pattern with sufficient strength to ensure reliable recovery during a subsequent read operation.

A related issue is that for longer symbol lengths (e.g., 5T, 8T, etc.), adjacent track erasure can arise, thereby limiting track per inch (TPI) densities that can be achieved. That is, longer symbol lengths may tend to provide radially "wider" symbols as compared to shorter symbol lengths due to the extended application of power from the write element to the medium.

Thus, using a reduced frequency channel clock rate T to accommodate short symbol writes may tend to increase adjacent track interference and serve as an upper limit on achievable TPI densities, particularly in shingled magnetic recording (SMR) applications where previously written tracks are partially overlapped by subsequently written tracks. The foregoing limitations are not limited to magnetic recording, but can arise in other data recording systems as well such as optical data recording systems that rely on changes in optical detection levels to mark symbol boundaries.

Accordingly, various embodiments of the present disclosure are generally directed to a method and apparatus for writing data to a data recording medium. As explained below, some embodiments provide a write driver circuit that supplies bi-directional write currents to a write element, such as but not limited to a magnetic coil. Data are written in the form of a sequence of nT symbols over a selected range, where T is a channel clock rate and n is an integer such as from a minimum value for n=X to a maximum value for n=Y. Alternating symbols are written using opposing rail currents of selected respective magnitudes.

For relatively longer symbol lengths, an intermediate current value between the two rail current magnitudes is applied to the write element for at least one channel clock period prior to the next transition (symbol boundary). In this way, the current switching time to initiate the writing of the next symbol can be reduced. This can be achieved in a variety of ways, such as by adding a zero status to the data stream or temporarily disabling the write current at the end of each symbol.

Since many modern transducers are designed to switch multiple bits downstream for each write, the length of time during which the intermediate current value is applied can be tuned to the head configuration. Experimental results have shown significant reductions in rise times for current switching using this approach, and it is contemplated that the technique allows the use of higher data clock rates and greater data recording densities (e.g., higher BPI and TPI values).

While it is contemplated that the rail current magnitudes will be equal and opposite values, such as nominally ±25 milliamps, mA, such is not required. Depending on the type of medium and the write characteristics of the write element, the rail current magnitudes can be any suitable values including values with different magnitudes (e.g., +40 mA and −35 mA; +30 mA and 0 mA, etc.). Similarly, while a zero current value can be used for the intermediate level, other values of relatively small current can be applied, including intermediate values that are selected based on factors such as the size of a given symbol and/or the direction of the switching current.

It has been found by the inventors that write power wave shaping using intermediate values in accordance with various embodiments disclosed herein can provide a substantial reduction of adjacent track erasure effects. Adjacent track erasure generally involves the partial erasure of the data stored on an adjacent track. Adjacent track erasure arises due to the application of write current to a target track; the larger the write current, generally the wider the adjacent track erasure, and the longer the write current is applied, generally the wider the adjacent track erasure. Since zero or small current is applied to the writing of some bits, the adjacent track erasure can be reduced. This in turn allows further reductions in track pitch and higher TPI values.

The techniques disclosed herein can be applied to any number of different forms of recording systems, including but not limited to perpendicular magnetic recording (PMR), longitudinal magnetic recording (LMR), heat assisted magnetic recording (HAMR), microwave assisted magnetic recording (MAMR), two dimensional magnetic recording (TDMR), shingled magnetic recording (SMR), etc. The write currents as discussed herein can be supplied to magnetically responsive writer elements (e.g., magnetic write coils) as well as other forms of write devices such as, for example, a laser diode used in a HAMR system, an optical or magneto/optical system, etc.

These and other features of various embodiments of the present disclosure can be understood beginning with a review of FIG. 1 which provides a simplified representation of a data storage device 100 of the type used to store and retrieve user data from a host device. The device 100 includes a controller (control circuit) 102 and a memory module 104. The controller 102 provides top level communication and control functions as the device interfaces with the host device. Data from the host device is transferred for storage in the memory 104.

In some cases, the controller 102 can take the form of a hardware or programmable processor with associated programming in a memory location to carry out the requisite control functions. The memory 104 can take any number of configurations to provide non-volatile storage of data, including but not limited to magnetic recording discs, optical recording discs, etc. The memory 104 may include circuitry in the form of channel electronics, preamplifier/driver stages, spindle and actuation motors, etc.

Figure 2:
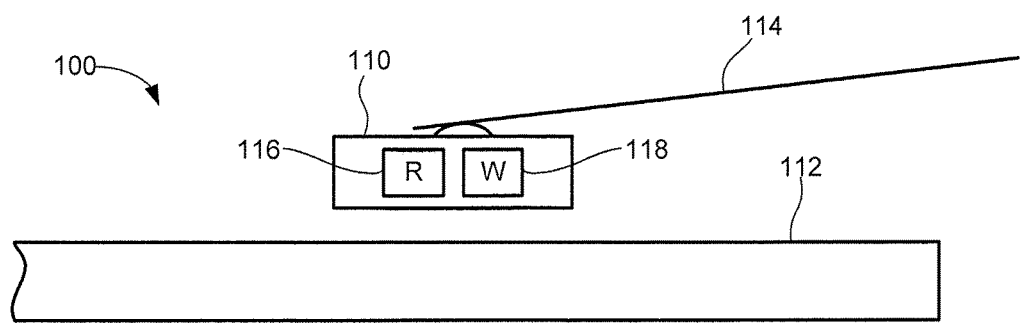
FIG. 2 shows a data transducer adjacent a data recording medium in some embodiments of the data storage device of FIG. 1.

FIG. 2 shows an elevational representation of a data transducer 110 of the data storage device 100 of FIG. 1 in accordance with some embodiments. In FIG. 2, the storage device 100 is characterized as a hard disc drive (HDD), although such is merely for purposes of providing a concrete example and is not limiting. The techniques disclosed herein are applicable to a wide variety of data storage devices including hybrid drives, optical storage devices, magneto-optical storage devices, etc.

The data transducer 110 is controllably positioned adjacent a magnetic recording medium (disc) 112 using a flexible suspension (flexure) member 114. In some cases, an air bearing surface (ABS) may be formed on a slider portion of the transducer to maintain stable hydrodynamic flight of the transducer using fluidic atmospheric currents established by the high speed rotation of the disc 112.

The data transducer 110 (also referred to as a "head") includes a number of operative elements including a read (R) element 116 and a write (W) element 118. The read element may take the form of a magnetoresistive (MR) sensor, and the write element may take the form of a perpendicular magnetic writing coil. Other forms for these elements can be used as desired. Additional operative elements can be incorporated into the transducer 110 such as a heat assisted magnetic recording (HAMR) system, a fly height adjustment (FHA) mechanism, contact sensors, etc.

Figure 3:
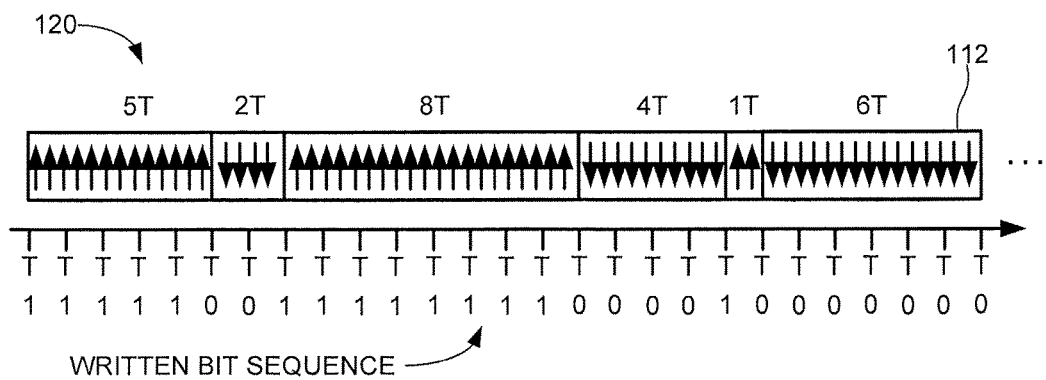
FIG. 3 represents an exemplary magnetization pattern for the medium of FIG. 2.

FIG. 3 shows a magnetization pattern 120 that is written by the write element 118 to a recording layer of the medium 112 from FIG. 2 during a write operation. A perpendicular magnetic recording pattern is shown, although such is merely exemplary and is not limiting. The perpendicular magnetization direction is vertical, or perpendicular, to the top surface of the medium 112, and constitutes a sequence of symbols of alternating magnetic orientation.

The pattern 120 is written as a sequence of symbols with lengths nT where T is a channel clock rate at a selected frequency and n is an integer which ranges over a selected interval set from a minimum value X to a maximum value Y. For purposes of the present discussion, the encoding scheme is contemplated as providing symbols of from 1T to 8T in length. Other encoding schemes can be used. FIG. 3 shows an exemplary symbol sequence of 5T, 2T, 8T, 4T, 1T and 6T symbols that have been written to the medium 112.

Each symbol boundary provides a magnetic flux transition (reversal in magnetic direction) and encodes a logical 1 on the medium. Channel periods between symbol boundaries are encoded as logical 0s. Hence, the 5T symbol is interpreted as the bit pattern 11111, the 2T symbol is interpreted as the bit pattern 00, and so on. The number of arrows representing each symbol is not significant other than to denote an exemplary magnetic orientation for that particular region of the medium 112.

FIG. 4 shows the transducer (head) 110 of FIG. 2 in conjunction with a read/write (R/E) channel circuit 130 and a preamplifier/driver circuit (preamp) 132. The channel 130 can be realized in a number of different hardware or programmable processor configurations, including SOC (system on chip) integrated circuit devices, programmable devices that use programming in memory to execute program steps, state machines, hardwired logic gates, transistors, etc. Regardless of form, the channel circuit includes encoding circuitry used during write operations to transition input write data to a sequence of symbols. The channel 130 further includes decoding circuitry used during read operations that reconstructs the originally written data from a recovered bit sequence corresponding to the originally written symbols. The preamp 132 includes write driver and read amplification and conditioning circuitry to interface with the transducer 110.

During a read operation the flux transitions provide readback pulses in a readback signal generated by the read sensor 116 (FIG. 2). The pulses are used to adjust a variable clock oscillator (VCO) or similar circuit in the channel 130 to establish a readback clock that provides search windows at each T interval. In this way, the bit sequence shown in FIG. 3 can be recovered by the channel and decoded to provide the originally stored user data sequence.

FIG. 5 shows a write driver circuit 140 of the preamp 132 of FIG. 4. The write driver circuit can take any number of suitable forms, including an H-bridge circuit made up of power MOSFETs (metal oxide semiconductor field effect transistors) connected in an H-configuration, an operational amplifier circuit, a digital to analog converter (DAC) circuit, etc. Responsive to an input symbol sequence, the write driver 140 supplies bi-directional write currents to a write coil 142 of the write element 118 (FIG. 2) to write magnetization patterns such as represented in FIG. 3. Except as modified below, the write currents nominally switch direction at each symbol boundary between a maximum rail current $I_{MAX}$ from current source 144 and a minimum rail current $I_{MIN}$ from current source 146. The rail currents can vary, but exemplary values may be ±25 milliamps, mA, etc. Any suitable current values can be used, including asymmetric values (e.g., +15 mA and −20 mA; +30 mA and 0 mA, etc.). It will be noted that a write element that functions in an on-off mode (e.g., a laser beam recorder, a HAMR laser diode, etc.) may utilize nominally 0 mA as one of the rail current magnitudes.

Rail voltage sources can be used by the write driver in lieu of the current sources represented in FIG. 5, but write currents will still be applied through the coil to effect the desired magnetization fields to magnetize the medium. Therefore, the present discussion will discuss the write driver in terms of applied write currents. This applies to other forms of write elements as well since even if voltages are applied, currents will flow through the write element.

FIG. 6 is a graphical representation of respective write current command signals 148, 150 generated in accordance with some embodiments. The signals 148, 150 are plotted against an elapsed time x-axis 152 and a combined current magnitude y-axis 154. The signals 148, 150 generally take the form of extended frequency modulated (EFM) signals with alternating levels from −1 to +1 and signal transitions T(1) through T(4) at symbol boundaries. Three (3) symbols having lengths of 7T, 3T and 1T are shown, although other symbol lengths can be used as desired.

The signal 148 generally represents a conventional extended frequency modulated (EFM) command signal provided to a write driver circuit such as 140 in FIG. 5 to write the three symbols shown in FIG. 6. EFM signals are suitable but not limiting, as the data sequence can be presented in other forms (TTL signals, multi-bit digital signals, etc.).

A full rail-to-rail current switching operation is required to transition between each adjacent pairs of symbols. For example, negative-to-positive current switching transitions in signal 148 are denoted at the transitions T(1) and T(3) as the system commences writing the 7T and 1T symbols, respectively. Positive-to-negative current switching transitions are denoted at the transitions T(2) and T(4) to signify the writing of the 3T symbol and the symbol that immediately follows the 1T symbol.

While operable, it has been found that switching the write current between the $I_{MIN}$ and $I_{MAX}$ current rails can require a relatively significant amount of rise time and settle time as the current direction is switched over the full range between the respective rails (e.g., from −25 mA to +25 mA and vice versa). This can provide an upper limit to the smallest achievable symbol size based on the non-instantaneous response characteristics of the circuit.

Accordingly, various embodiments configure the storage device 100 to provide intermediate current values, or levels, immediately before certain symbol boundaries. The intermediate (reduced) current values are between the respective rail current values levels $I_{MAX}$ and $I_{MIN}$. This is represented in signal 150 at 156 prior to transition T(2) and 158 prior to transition T(3). The intermediate current level can be any suitable value between the respective rail currents. In some embodiments, the $I_{MAX}$ and $I_{MIN}$ values are nominally about ±25 mA and the intermediate value is nominally about 0 mA. The EFM signal 150 can thus be considered as a tri-state signal with three logical values −1 ($I_{MIN}$), 0 (intermediate value) and +1 ($I_{MAX}$).

In at least some embodiments, the intermediate value is not applied to all symbols in the sequence. Instead, the intermediate value is only applied to symbols of a minimum particular length. For example, in one embodiment the intermediate values are not applied to the shortest symbol lengths of 1T and 2T, but are applied to longer symbol lengths such as 3T and above, as represented in FIG. 6 for EFM curve 150. In another embodiment, the intermediate value is applied to all but the shortest symbol length (e.g., 1T).

The intermediate values at the end of each symbol (e.g., 156, 158) reduce the overall current swing necessary for the next symbol boundary. As can be observed from FIG. 6, the transition at T(2) for signal 148 requires nominally a full 50 mA current swing, while the same transition for signal 150 only requires about half that, or about 25 mA. Using one or more intermediate values as represented in FIG. 6 can provide significantly faster current switching and higher data recording densities.

The length of time during which the intermediate value is applied will depend on a number of factors, including the construction of the write element 118 and the encoding scheme. It is contemplated that the intermediate value will be applied for at least one clock period (e.g., T interval or "bit") prior to the next occurring symbol boundary. Even though an intermediate value is being applied, the medium will still be magnetized or otherwise recorded ("marked") as if the "full" value of current had been applied during that bit interval.

In further embodiments, particularly longer symbols may further utilize an intermediate value in a middle portion of a symbol, such as denoted at 160 in FIG. 6 for the 7T symbol written using curve 150. This can reduce the overall power usage of the system. Writing the exemplary 7T symbol using curve 150 can thus be described as switching to the positive rail current at a beginning portion of the selected symbol (segment 162), applying the intermediate current value to an intermediate portion of the selected symbol (segment 160), resuming application of the positive rail current (segment 164), and resuming application of the intermediate current value at an ending portion of the selected symbol (segment 156) just prior to the next transition (T(2)). A similar sequence would be carried out using the negative rail current.

Figure 7:
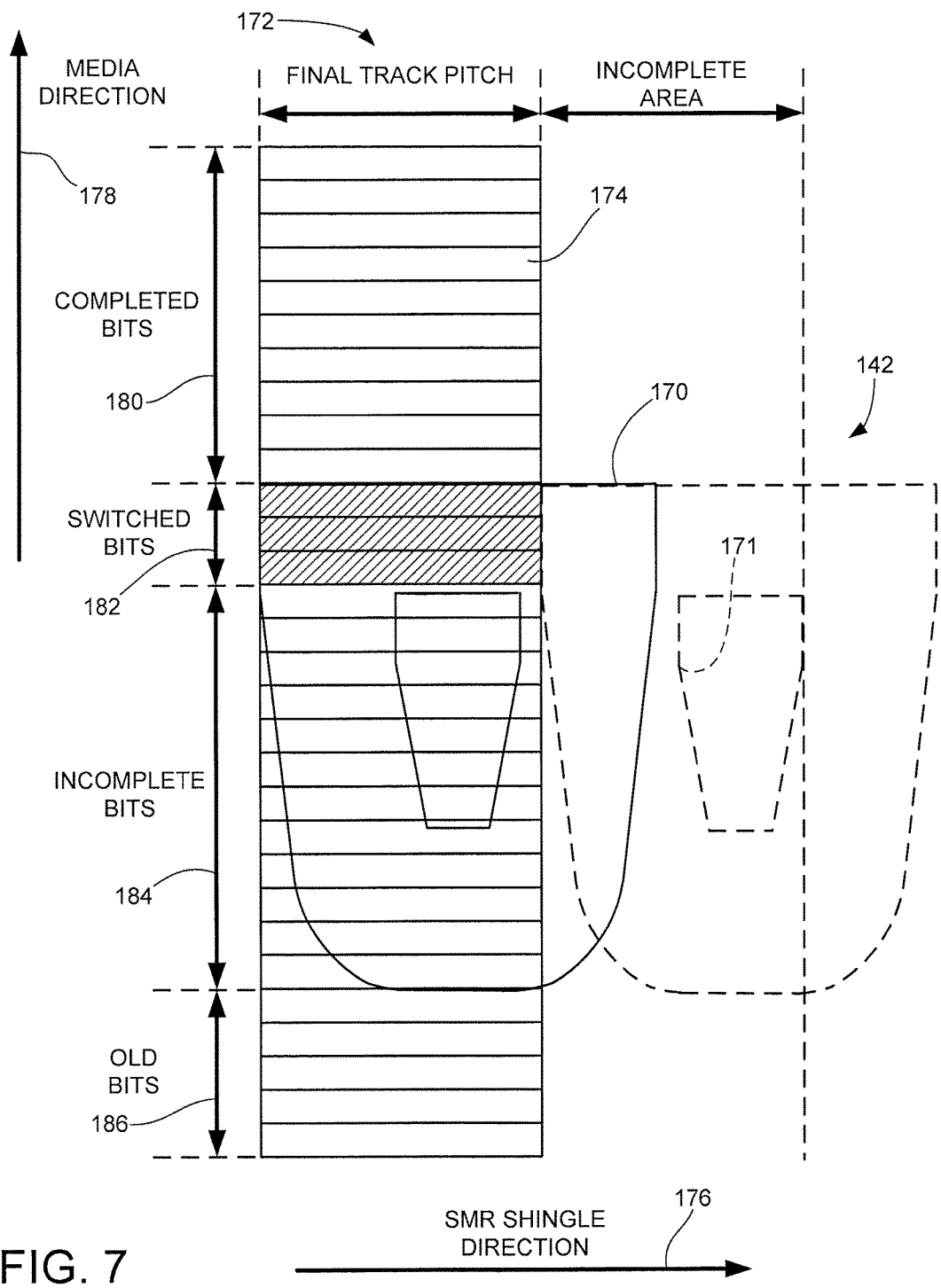
FIG. 7 is a schematic representation of a write operation using the write coil of FIG. 5 to a selected track of the medium.

FIG. 7 is a schematic top plan view of an active portion 170 (e.g., write pole structure) of the write coil 142 (FIG. 5) and an associated track 172. The actual configuration of the active portion 170 will depend on the construction of the storage device, so the geometry shown in FIG. 7 is merely exemplary and is not necessarily limiting. A central aperture 171 may be provided within the structure, or a solid pole tip configuration may be provided.

Individual bits 174 along the track 172 correspond to the channel clock rate T and are represented by rectangular boxes. Shingled magnetic recording (SMR) techniques are applied so the final track geometry is shown for track 170. That is, after having written the pattern to track 170, the active portion 170 of the write coil 142 is radially advanced in direction 176 (the new position is shown in dotted line fashion) and a new track is written that partially overlaps the previously written track 170. The direction of movement of the medium relative to the write coil 142 is represented by arrow 178. It will be apparent that while the various embodiments disclosed herein are particularly suitable for SMR techniques, such is not required.

The bits along the track 172 have different statuses during the write operation as shown. Completed bits (e.g., bits that have been successfully written by the active portion 170) are denoted at 180. Actively switched bits (e.g., fully written bits that are being switched by the active portion 170) are denoted at 182 and are shown in cross-hatch fashion for reference. It will be noted that the fully switched bits are located at a trailing edge of the active portion 170

Incomplete bits are represented at 184. As will be recognized, a bit may include many magnetic grains in the recording layer. An incomplete bit is one in which not all of the grains have been completely switched from positive to negative or negative to positive since the bit is not fully covered by the writer footprint. These bits will eventually be fully switched (e.g., complete bits) once the active portion is advanced via rotation of the medium so that the trailing edge of the active portion passes over the bits. Old bits are denoted at 186 and represent old data previously written during a previous write operation and which are about to be overwritten by the present write operation. Each of the bits 174 will nominally have a selected magnetization (e.g., into or out of the page) based on the direction of write current. Flux transitions will occur at certain bit boundaries in the manner described above (see e.g., FIG. 3).

From FIG. 7 it can be seen that the configuration of the write coil 142 is such that multiple bits (e.g., the three switched bits 182) are switched concurrently. Accordingly, the arrangement of FIG. 7 would allow the intermediate value of current to be applied for up to two clock periods (two bits 174) prior to each transition on the basis that these bits will have already been magnetized to the correct magnetization orientation. Similarly, longer symbol lengths, such as the 7T symbol referenced in FIG. 6, can have one or more intermediate bits 174 with the intermediate current value since these bits will also have been already magnetized to the correct orientation. The use of intermediate values during the writing of relatively longer symbols can provide a number of beneficial effects, including reduced power and heat dissipation, reduced coil saturation, minimized adjacent track erasure, etc.

Figure 8:
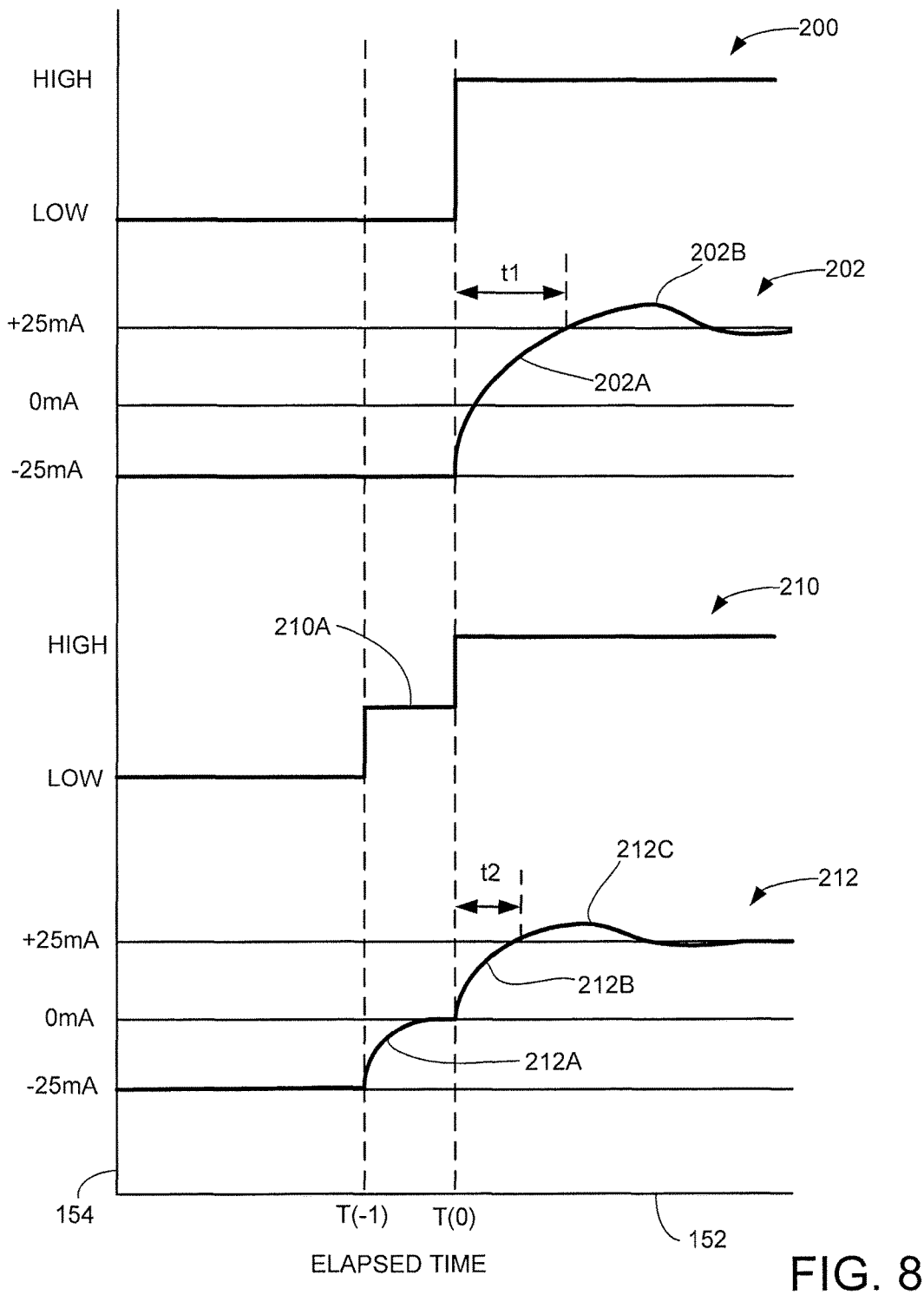
FIG. 8 is a timing diagram showing benefits of the various illustrative embodiments of the present disclosure.

FIG. 8 shows timing diagram waveforms to further illustrate the operation of the system of FIG. 7. A first EFM signal 200 represents a conventional low-to-high current command signal to induce a transition at T(0). A corresponding current curve 202 represents actual current flowing through the write coil as a result of the commanded change in current direction from signal 200.

The actual rise time and settle characteristics of the current will vary, but it will be recognized that, due to the inductance of the coil, the current will not switch instantaneously. Rather, the current will undergo some measure of rise time as it transitions to the new direction of flow, as represented by segment 202A, followed by a settle time (segment 202B). As the current rises, it reaches the positive rail magnitude (e.g., +25 mA) and temporarily rises above this to a higher value (e.g., +40 mA) before falling to and settling at the positive rail magnitude. A time interval t1 represents the time interval required from time T(0) until the current reaches the maximum rail value (e.g., +25 mA) from the minimum rail value (e.g., −25 mA). It is contemplated that effective writing of the data will commence once the current reaches the maximum rail value.

A second EFM signal 210 in FIG. 8 represents a tri-state signal with one or more intermediate values as discussed above. The signal 210 includes a segment 210A during which the intermediate value (which in this case is nominally about 0 mA) is applied by the write driver 142 (FIG. 5) for a preceding clock period (e.g., from T(−1) to T(0)). This provides a current curve 212 representing the current through the write coil 142 with a first rising portion 212A, a second rising portion 212B and a settle portion 212C.

The second rising portion 212B only needs to transition from about 0 mA to +25 mA, which is a significantly smaller interval than for rising portion 202A. This provides curve 212 with a faster rise time t2 that is significantly less than the rise time t1 in curve 202. Empirical testing has determined that the rise time can be consistently reduced by about 35% or more using an intermediate value as depicted in FIG. 8.

While FIG. 8 shows a negative-to-positive transition, it will be appreciated that similar performance improvements are obtained using positive-to-negative transitions. That is, at the next flux transition, the current will drop to about 0 mA just before the next symbol boundary is reached.

With reference again to FIG. 4, the R/W channel 140 includes a write control circuit 220 configured to provide write command signals to the write driver 140 (FIG. 5) so that the write driver outputs respective rail current and intermediate values through the write coil. In some embodiments, a tri-state EFM signal such as 150 (FIG. 6) or 210 (FIG. 8) is generated so that the intermediate values are received by the write driver as commands for zero (or some other suitable intermediate value) of current. Other control mechanisms can be utilized, such as enable/disable signals which are provided in addition to a "conventional" EFM signal with conventional full-rail transitions such as represented at 148 and 200. The enable/disable signals can operate to temporarily disengage further outputting of current by the write driver.

The write control circuit 220 can be realized in hardware or software, or can involve functionality supplied by the controller 102 (FIG. 1) as required. In some cases, the circuit 220 analyzes the generated symbol sequence in the input encoded data stream and interjects intermediate values as required to form a modified symbol sequence which is then output to the write driver. In other embodiments, conventional input data sequences can be supplied to the preamp 144 (FIG. 5) and the preamp can be provided with internal circuitry that performs these functions. The length of the applied intermediate value (e.g., one bit, multiple bits) can be the same for all symbol lengths above a minimum symbol length, or the length can vary for different lengths of symbols.

In some cases, the timing of the intermediate values can be clocked independently of the symbols so that the beginning of the intermediate values is not tied to bit boundaries. Multiple intermediate values can also be used, based on different current switching directions and/or different symbol lengths. For example, a first intermediate value, such as −5 mA, can be used when switching in a first direction (such as from low to high) and a second intermediate value, such as +5 mA, can be used when switching in a different second direction (such as from high to low). Care should be taken to ensure that the applied intermediate value does not degrade or otherwise affect the just programmed state of the associated bits adjacent the write coil.

Figure 9:
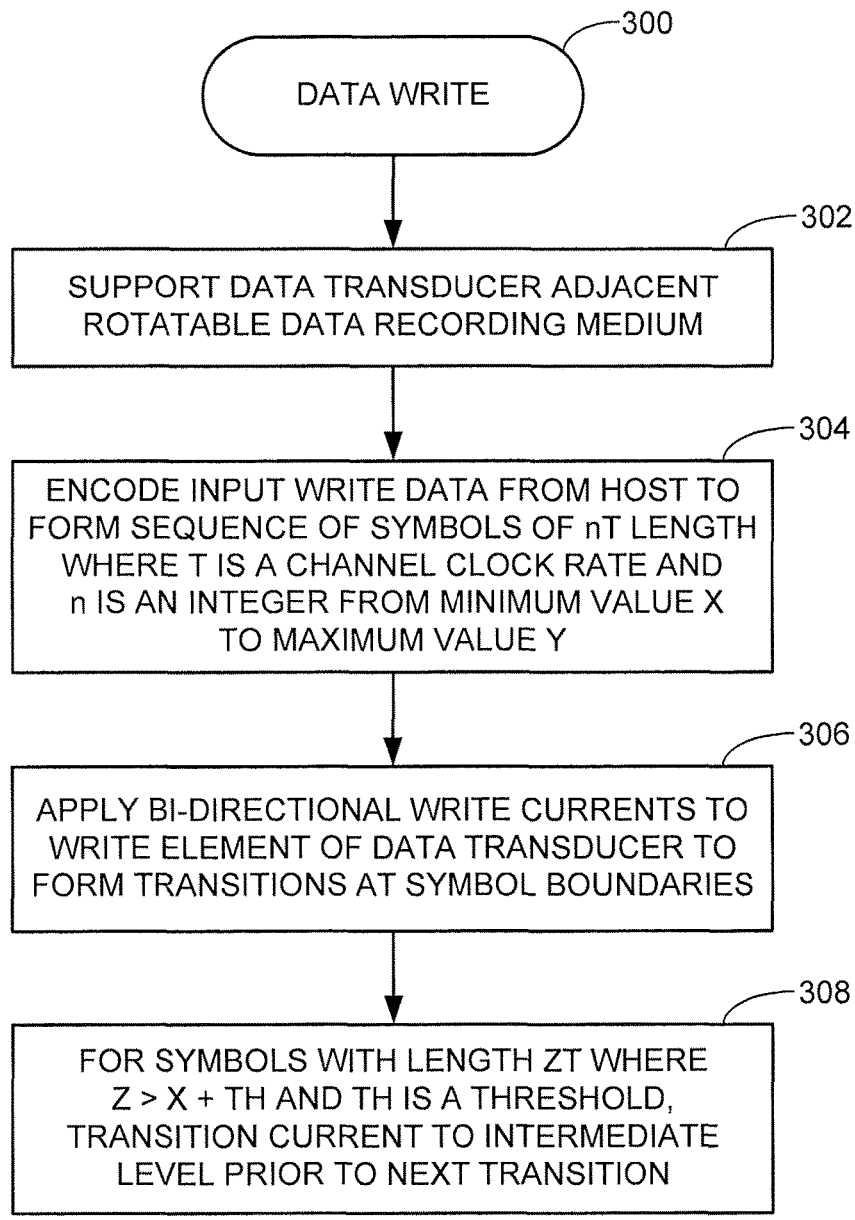
FIG. 9 is a flow chart for a data write routine illustrative of steps carried out in accordance with various embodiments.

FIG. 9 provides a flow chart for a data write routine 300 illustrative of steps carried out in accordance with the foregoing discussion. The routine 300 is merely exemplary and can be modified as required.

At step 302, a data transducer such as 110 is supported adjacent a rotatable data recording medium such as 112 (see FIG. 2). Input write data from a host device is encoded at step 304 to form a sequence of symbols. The symbols have nominal lengths of nT where T is a channel clock rate and n is an integer over a selected range (e.g., from X to Y). As discussed above, such encoding may arise from the application of run length limited (RLL) techniques and will provide a suitable range of symbol lengths that govern how closely spaced and how far apart symbol boundaries (e.g., logical 1s) can be spaced on the medium.

Bi-directional write currents are applied to a write element (e.g., magnetic write coil 142) using a write driver at step 306. These write currents form transitions at symbol boundaries on the medium. In the case of a magnetic data recording medium as discussed herein, the transitions will form magnetic flux transitions or reversals. Other forms of media, such as optical media, may form pits and lands (marks and spaces) in a recording layer with different levels of reflectivity (e.g., optical reversals occur at symbol boundaries).

During the application of the write currents, the currents are transitioned as shown by step 308 to an intermediate level (or multiple intermediate levels) prior to successive transitions. Such processing may be applied to all symbols, or for only those symbols with a length ZT where Z is a value that falls between X and Y and is greater than the minimum value X by some threshold value TH. In one example, the symbol lengths are from 1T to 8T (so that X=1 and Y=8), TH is 2, and so Z is greater than or equal to 3 and the transitions are applied to symbols 3T to 8T.

From the foregoing discussion it can be seen that the various embodiments presented above may provide a number of benefits. The use of the intermediate values reduce the switching interval and hence, the switching time at successive symbol boundaries. This can allow the use of a higher effective channel clock rate T and enhance both BPI and TPI densities on a data recording medium.

While various embodiments have been presented in the context of rotatable magnetic recording media, other forms of storage media can be utilized as well, including optical media, magneto-optical recording media, HAMR media, microwave assisted magnetic recording (MAMR) media, multi-dimensional media, etc.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
generating a sequence of symbols to describe a set of write data, the symbols of nT length where T is a channel clock rate and n is an integer over a selected range, the symbols generated by applying run length limited (RLL) encoding to a set of input user data to specify both a minimum value X and a maximum value Y for n; and applying bi-directional write currents to a write element to record the sequence of symbols to a storage medium, the write currents switching between a first rail current and a second rail current for alternating symbols, the write currents further transitioning to an intermediate current value for at least one channel clock period immediately preceding a next occurrence of a symbol boundary between an adjacent pair of symbols in the sequence, the intermediate current value applied to the last channel clock period of each symbol having a length of ZT, where Z is greater than or equal to X+TH where TH is a predetermined threshold integer, the intermediate current value not applied to the last channel clock period of each symbol having a length less than ZT.

2. The method of claim 1, wherein the first rail current is greater than 0 mA, the second rail current is less than 0 mA, and the intermediate value is nominally 0 mA.

3. The method of claim 1, wherein for each symbol having the length of ZT, the associated first or second rail current is applied during all of the preceding channel clock periods of the associated symbol prior to application of the intermediate current value to the last channel clock period of the associated symbol.

4. The method of claim 1, further comprising supporting a data transducer adjacent the storage medium, the storage medium characterized as a magnetic recording medium having a plurality of tracks and the write element characterized as a magnetic write coil, wherein the magnetic write coil concurrently fully magnetizes a plurality of bits along a selected track, the intermediate current value reducing adjacent track erasure on an adjacent track.

5. The method of claim 4, wherein the plurality of bits that are concurrently fully magnetized by the write coil is a number m bits, and wherein the intermediate current value is applied for the last m−1 bits of each symbol.

6. The method of claim 1, wherein the applying step further comprises writing a selected symbol to the medium by switching to a selected one of the first or second rail currents at a beginning portion of the selected symbol, applying the intermediate current value to an intermediate portion of the selected symbol, resuming application of the selected one of the first or second rail currents, and resuming application of the intermediate current value at an ending portion of the selected symbol immediately prior to switching to the remaining one of the first or second rail currents at the next symbol boundary.

7. The method of claim 1, wherein the first and second rail currents have different absolute magnitudes.

8. The method of claim 1, wherein the intermediate current value has a steady-state nonzero positive or negative current magnitude between the first and second rail current magnitudes.

9. The method of claim 1, wherein X is equal to 1 so a smallest symbol length in the sequence of symbols of nT length is 1T.

10. An apparatus comprising:
a data recording medium;
a write element controllably positionable adjacent the data recording medium to write data thereto;
a channel circuit configured to generate a sequence of symbols of nT length where T is a channel clock rate and n is an integer over a selected range; and a write driver configured to apply bi-directional write currents to the write element to record the sequence of symbols to the data recording medium responsive to an input supplied to the write driver circuit by the channel circuit, the write currents switching between a positive rail current and a negative rail current for alternating symbols, the write currents further transitioning to an intermediate current value between the respective positive and negative rail currents for at least one channel clock period immediately preceding a next occurrence of a symbol boundary between an adjacent pair of symbols in the sequence, the adjacent pair of symbols in the sequence comprising a first symbol followed by a second symbol, the write currents further being continuously maintained at the associated first or second rail current during each of the preceding clock periods prior to the at least one channel clock period during which the intermediate current value is applied.

11. The apparatus of claim 10, wherein the channel circuit supplies a tri-state extended frequency modulation (EFM) signal to the write driver circuit indicative of the sequence of symbols of nT length, the tri-state EFM signal having a first state corresponding to the positive rail current, a second state corresponding to the negative rail current, and a third state corresponding to the intermediate current value.

12. The apparatus of claim 10, wherein the data recording medium is a magnetic recording disc rotated at a selected velocity adjacent the write element during a write operation, and the write element comprises a magnetic write coil controllably positioned adjacent the magnetic recording disc which applies a bi-directional magnetic write field to the magnetic recording disc responsive to the bi-directional write currents from the write driver.

13. The apparatus of claim 12, wherein the write coil concurrently fully magnetizes a number m bits on the magnetic recording disc, and the intermediate current value is applied for the last m−1 bits of each symbol.

14. The apparatus of claim 10, wherein the nT symbols range in length from a minimum duration XT to a maximum duration YT, wherein for symbols of length ZT and greater where Z is between X and Y, the intermediate current value is applied to the last channel clock period, and wherein for symbols of length less than ZT, the intermediate current value is not applied.

15. The apparatus of claim 10, wherein the write driver is further configured to supply write currents to the write element to write a selected symbol to the data recording medium by switching to a selected one of the positive or negative rail currents at a beginning portion of the selected symbol, applying the intermediate current value to an intermediate portion of the selected symbol, resuming application of the selected one of the positive or negative rail currents, and resuming application of the intermediate current value at an ending portion of the selected symbol.

16. The apparatus of claim 10, wherein the channel circuit generates the symbols by applying run length limited (RLL) encoding to a set of input user data to specify both a minimum value X and a maximum value Y for n, and wherein the write driver applies the intermediate current value to the last channel clock period of each symbol having at least a length of ZT, where Z is greater than or equal to X+TH where TH is a predetermined threshold integer.

17. A data storage device comprising:
a rotatable magnetic data recording medium;
a write element controllably positionable adjacent the data recording medium to write data to a recording layer there as a magnetic pattern;

a channel circuit configured to generate a sequence of symbols of nT length where T is a channel clock rate and n is an integer over a selected range from a minimum value n=X to a maximum value n=Y, the channel circuit outputting an extended frequency modulation (EFM) signal that encodes the sequence of symbols using a first voltage level corresponding to a first magnetization direction, a second voltage level corresponding to an opposing second magnetization direction, and a third voltage level between the first and second voltage levels; and a write driver configured to apply bi-directional write currents to the write element to record the sequence of symbols to the data recording medium responsive to receipt of the EFM signal, the write currents comprising a positive rail current corresponding to the first voltage level in the EFM signal, a negative rail current corresponding to the second voltage level in the EFM signal, and an intermediate current value corresponding to the third voltage level in the EFM signal, the EFM signal switching between the first and second voltage levels at boundaries between successive symbols in the sequence of symbols, the intermediate current value applied for at least one channel clock period immediately preceding a next occurrence of a symbol boundary between each adjacent pair of symbols in the sequence in which a preceding symbol in the adjacent pair of symbols has a length of ZT, where Z is between X and Y and is equal to or greater than X+TH where TH is an integer, the write driver not applying the intermediate current value for symbols of length less than ZT.

18. The data storage device of claim 17, wherein the nT symbols range from 1T to at least 6T in length, the intermediate current value is not applied to symbols of less than 3T in length, and the intermediate current value is applied to symbols of at least 3T in length.

19. The data storage device of claim 17, wherein the channel circuit generates the sequence of symbols by applying run length limited (RLL) encoding to a set of input data.

20. The data storage device of claim 17, wherein for the symbols that have the length of ZT, the associated positive or negative rail current is applied to all of the remaining channel clock periods of the associated symbol prior to the application of the intermediate current value.

* * * * *